(12) United States Patent
Kang et al.

(10) Patent No.: US 8,476,807 B2
(45) Date of Patent: Jul. 2, 2013

(54) RIGID DUAL-SERVO NANO STAGE

(75) Inventors: Eun Goo Kang, Seoul (KR); Young Jae Choi, Seoul (KR); Seok Woo Lee, Yongin-si (KR); Sang Moo Lee, Yongin-si (KR); Kyung Tae Nam, Yongin-si (KR); Sang Hoon Ji, Seoul (KR)

(73) Assignee: Korea Institute of Industrial Technology, Cheonan-si, Chungnam (KR)

( * ) Notice: Subject to any disclaimer, the term of this patent is extended or adjusted under 35 U.S.C. 154(b) by 100 days.

(21) Appl. No.: 13/054,683

(22) PCT Filed: Apr. 17, 2009

(86) PCT No.: PCT/KR2009/002015
§ 371 (c)(1),
(2), (4) Date: Jan. 18, 2011

(87) PCT Pub. No.: WO2009/134031
PCT Pub. Date: Nov. 5, 2009

(65) Prior Publication Data
US 2011/0181151 A1 Jul. 28, 2011

(30) Foreign Application Priority Data
May 2, 2008 (KR) .......................... 10-2008-0041204

(51) Int. Cl.
*H01L 41/083* (2006.01)
(52) U.S. Cl.
USPC ............................. 310/328; 310/329; 310/330

(58) Field of Classification Search
CPC ..................................................... H01L 41/083
USPC ......................................... 310/328, 329, 330
See application file for complete search history.

(56) References Cited

U.S. PATENT DOCUMENTS

| 5,847,488 | A | 12/1998 | Yoshida et al. | |
| 7,230,366 | B2 * | 6/2007 | Sasaki et al. | 310/323.17 |
| 7,368,854 | B2 * | 5/2008 | Manabe | 310/323.17 |
| 7,432,636 | B2 * | 10/2008 | Ito et al. | 310/328 |
| 2006/0043824 | A1 * | 3/2006 | Sakano et al. | 310/323.09 |
| 2006/0103266 | A1 * | 5/2006 | Okamoto | 310/328 |
| 2007/0075609 | A1 * | 4/2007 | Manabe | 310/329 |

FOREIGN PATENT DOCUMENTS

| JP | 09-247967 | 9/1997 |
| JP | 2782715 | 5/1998 |
| KR | 10-0725990 | 5/2007 |

* cited by examiner

*Primary Examiner* — Thomas Dougherty
*Assistant Examiner* — Bryan Gordon
(74) *Attorney, Agent, or Firm* — Sherr & Jiang, PLLC

(57) ABSTRACT

The present invention relates to a stage, particularly to, a stage which is able to move minutely, having a rigidity-improved transfer part. A stage includes a work table on which a working object is placed, a motor configured to provide a rotational force, a shaft rotated by the motor to transfer the work table, a linear moving part configured to be expandable to linearly move the shaft in an axial direction, the linear moving part having a hollow to insert an end of the shaft therein, and an expanding part configured to be expandable as far as the shaft is moved by the linear moving part.

10 Claims, 4 Drawing Sheets

US 8,476,807 B2

RIGID DUAL-SERVO NANO STAGE

CROSS REFERENCE TO PRIOR APPLICATIONS

This application is a National Stage Patent Application of PCT International Patent Application No. PCT/KR2009/002015 (filed on Apr. 17, 2009) under 35 U.S.C. §371, which claims priority to Korean Patent Application No. 10-2008-0041204 (filed on May 2, 2008), which are all hereby incorporated by reference in their entirety.

TECHNICAL FIELD

The present invention relates to a stage, particularly to, a stage which is able to move minutely, having a rigidity-improved transfer part.

BACKGROUND ART

In general, nano-meter standard ultra-precise measure technology and process control technology has been utilized more and more in measuring an appearance of a high precision part, for example, an optical component in a short time, in measuring a critical dimension of a mask in a ultra-high integrated semiconductor processor and in micro-processing an appearance of a ultra-precise dimension by using a laser.

As devices related to such nano-device technology there may be FIB (Focused Ion Beam) devices, SEM (Scanning Electron Microscope) devices and stages used to micro-control a position of an object.

Commonly, the stage includes a work table having an object placed thereon, a driving unit configured to move the work stand along X and Y axes and a driving unit configured to rotate the work table.

FIG. 1 schematically illustrates a configuration of a conventional stage. According to the conventional stage, a ball screw 24 rotated by a motor 22 is a driving shaft and a slider 26 moved by the rotation of the ball screw 24 is connected with a work table. Then, the work table 10 is linearly transferred along an axial direction of the ball screw 24.

Furthermore, a Piezo-actuator 30 is provided on the work table 10 and long displacement transfer is performed by the rotation of the ball screw 24 and short displacement micro-transfer is performed by expansion of the Piezo-actuator 30.

DISCLOSURE OF INVENTION

Technical Problem

However, such the configuration of the conventional stage allows the ball screw 24 and the Piezo-actuator 30 to operate independently. Because of that, it is difficult to embody high resolution of the ball screw 24 and the Piezo-actuator 30 and displacement measuring devices 42 have to be provided to measure displacement of the ball screw 24 and the Piezo-actuator 30 disadvantageously.

To overcome this disadvantage, the Piezo-actuator 30 is provided on the work table 10. However, this structure will apply load to the Piezo-actuator 30 continuously when the ball screw 24 of the work table 10 is driven and there might be a problem of deteriorated rigidity which occurs in the Piezo-actuator 30.

As a result, to solve the above disadvantages, an object of the present invention is to provide a stage having a stable structure in an aspect of rigidity, with a simple configuration.

Technical Solution

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stage includes a work table on which a working object is placed; a motor configured to provide a rotational force; a shaft rotated by the motor to transfer the work table; a linear moving part configured to be expandable to linearly move the shaft in an axial direction, the linear moving part having a hollow to insert an end of the shaft therein; and an expanding part configured to be expandable as far as the shaft is moved by the linear moving part.

The stage may further include a first converting part configured to convert the rotation and linear motion of the shaft into a linear motion of the work table.

The first converting part may include a screw thread formed at a circumference of the shaft; and a slider configured to press the work table to linearly move the work table along the rotation and linear motion of the shaft, the slider engaging with the screw thread of the shaft.

A rotation shaft of the shaft may be in parallel to a rotation shaft of the work table.

The stage may further include a second converting part configured to convert the rotation and linear motion of the shaft into rotation of the work table.

The second converting part may include a screw thread formed at a circumference of the shaft; and a saw-tooth part formed in a predetermined portion of the work table to rotate the work table along the rotation and linear motion of the shaft, the saw-tooth part engaging with the screw tread of the shaft.

A rotation shaft of the shaft may be not in parallel to a moving direction of the work table.

The stage may further include a supporting stand provided at the other end of the shaft having the motor provided therein to support the shaft, the supporting stand elastically transformed as far as the transfer distance of the shaft moved by the linear moving part.

The expanding part may have freedom along an axial direction of the shaft, not in a rotational direction of the shaft.

The expanding part may be provided in a connecting portion between the shaft and the motor to transmit a rotational force of the motor to the shaft, even when the shaft is moved linearly.

The expanding part may enable a rotational shaft of the motor to be movable along an axial direction of the shaft in a predetermined range.

The linear moving part may be an actuator using a Piezo material.

Advantageous Effects

The present invention has following advantageous effects.

First of all, the linear moving part rotates the shaft to transfer the work table. The transfer distance may be measured by only a single scale.

Furthermore, the linear moving part is not pressed by the shaft. Because of that, too much load is not applied to the linear moving part. As a result, rigidity and reliability of the stage may be improved.

A still further, the shaft may be expandable, when the linear moving part pressing the shaft. As a result, the rigidity of the shaft may be improved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

BEST MODE

Reference will now be made in detail to the specific embodiments of the present invention, examples of which are illustrated in the accompanying drawings. Wherever possible, the same reference numbers will be used throughout the drawings to refer to the same or like parts.

Figure 1:
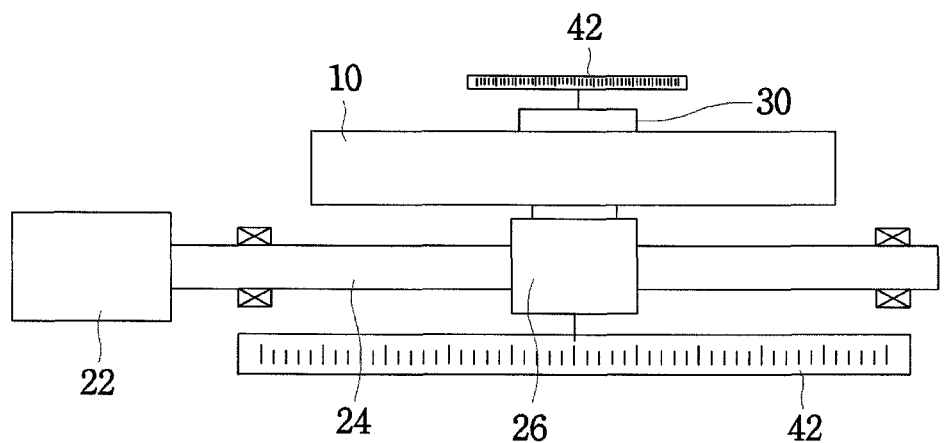
FIG. 1 is a side sectional view schematically illustrating a conventional stage.
Figure 2:
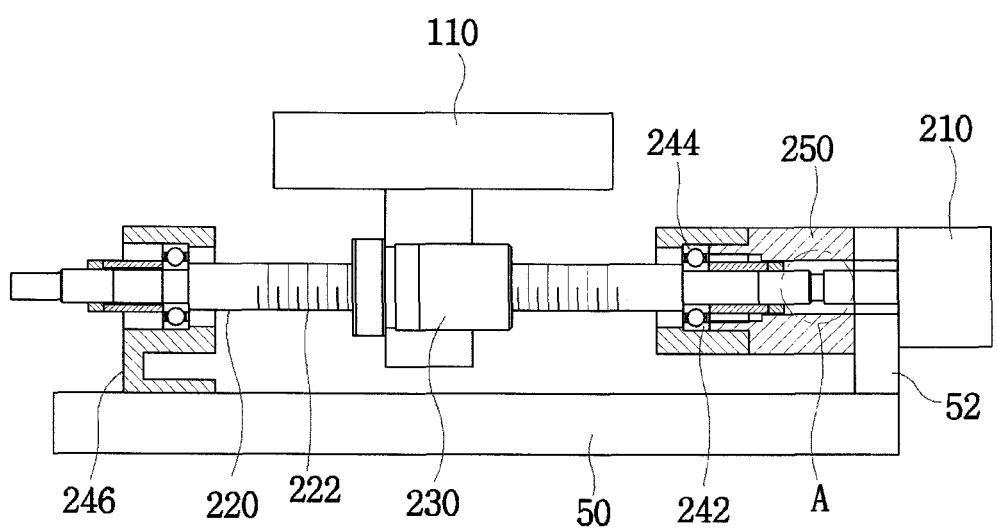
FIG. 2 is a sectional view illustrating a stage according to an exemplary embodiment of the present invention.

FIG. 2 is a diagram illustrating a stage according to an exemplary embodiment of the present invention.

The stage according to this embodiment includes a work table 110, a motor 210, a shaft 220 and a linear-moving part 250.

The work table 110 is a component at which a measurement object is processed or fixed. Such the work table 110 may be movable with respect to a plane or a space to move a position of the measurement object.

The shaft 220 is rotated to transfer the work table 110 and the motor 210 rotates the shaft 220.

The motor 210 is fixed to a fixing stand provided in an installation surface 50 and the installation surface 50 may be the ground or a predetermined surface of a device.

The shaft 220 may be coupled to a rotation shaft of the motor 210 to rotate. Bearings 244 and bearing housings 242 may be provided in both ends of the shaft 220, respectively, to allow the rotation of the shaft 220 to be smooth.

The shaft 220 may include a first converting part or a second converting part configured to press the work table 110 according to the rotation of the shaft 220 to transfer the work table 110. The first converting part and the second converting part will be described later in detail.

The linear moving part 250 may be expandable itself to move the shaft 220 in an axial direction.

The liner moving part 250 may be an actuator using a Piezo material. Here, 'Piezo-material' refers to a device having a volume expandable according to current load.

Figure 3:
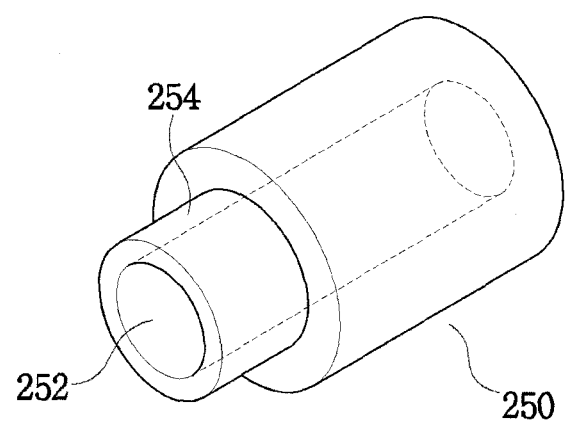
FIG. 3 is a perspective view illustrating a linear transfer part of FIG. 2.

Such the linear moving part 250 is provided between the motor 210 and the bearing housing 242, as shown in FIG. 3. Specifically, the linear moving part 250 includes a hollow 252 formed therein to insert the shaft therein and an end of the linear moving part 250 is stepped to be inserted in an inner circumferential surface of the bearing housing 242. The stepped end 254 may press the bearing 244 and the bearing housing 242 toward a predetermined direction according to the expansion.

A connecting portion between the shaft 220 and the bearing 244 may be stepped to allow the bearing 244 to press the shaft 220 according to the expansion of the linear moving part 250.

The shaft 220 and the first and second converting parts may be used to transfer the long displacement and the linear moving part 250 using the Piezo-material may be used to transfer the micro-displacement.

As a result, the shaft 220 is inserted in the hollow 252 of the linear moving part 250 and the linear moving part 250 may not receive the rotation force of the motor 210 nor the pressing force of the shaft 220. Because of that, too much load is not applied to the linear moving part 250, and reliability and rigidity of the stage may be enhanced accordingly.

Figure 4:
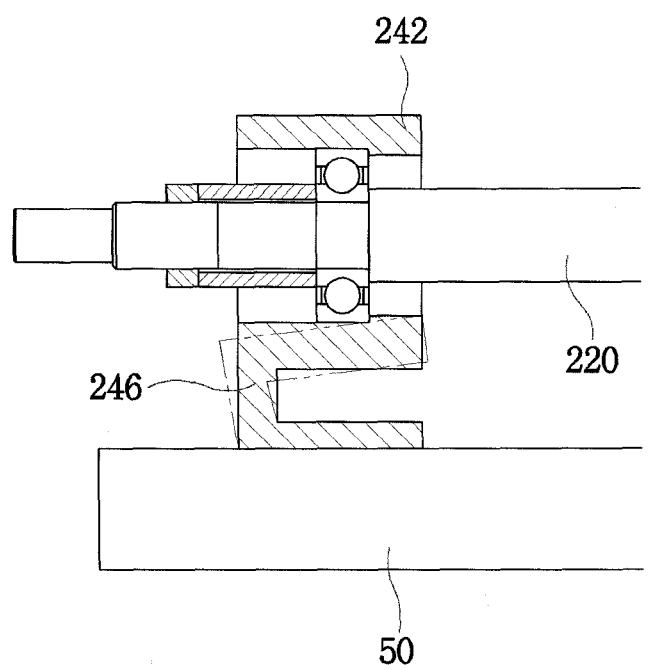
FIG. 4 is a sectional view illustrating a support of FIG. 2.

As shown in FIG. 4, a supporting stand 246 may be further provided to support one of the bearing housing 242 to the installation surface 50, the one provided at the opposite end to the end having the linear moving part 250, out of the bearing housings 242 provided in both ends of the shaft. The supporting stand 246 may be elastically transformed as much as the distance of the moved shaft 220.

This embodiment presents that the supporting stand 246 is integrally formed with the bearing housing 242, bending approximately in "⌐" shape to be advantageous in transforming, and the present invention is not limited thereto.

FIG. 4 shows that the transforming of the supporting stand 246 is exaggerating to make it understood easily and the micro-displacement of the shaft moved by the linear moving part 250 along the axial direction may be dozens of micrometers (μm) in the actual device. As a result, the large displacement shown in FIG. 4 may not be generated and a meaningful change may not occur in an overall geometrical structure.

As a result, the supporting stand 246 may be elastically transformed according to the axial direction motion of the shaft 200 such that the shaft 220 may be supported more stably and the shaft 220 may not be overloaded. Because of that, the deformity of the shaft may be prevented and precise transfer may be possible to improve the reliability and the usage life of the stage.

In addition, an expanding part 260 elastically expandable as far as the moved distance of the shaft 220 moved by the linear moving part 250 may be further provided.

The expanding part 260 may have freedom in the axial direction of the shaft, not freedom in the rotational direction of the shaft 220.

That is, the expanding part 260 may be configured to transmit the rotational force of the shaft 220 and to expand with respect to the axial direction movement of the shaft 220 to offset the axial direction movement.

Figure 5:
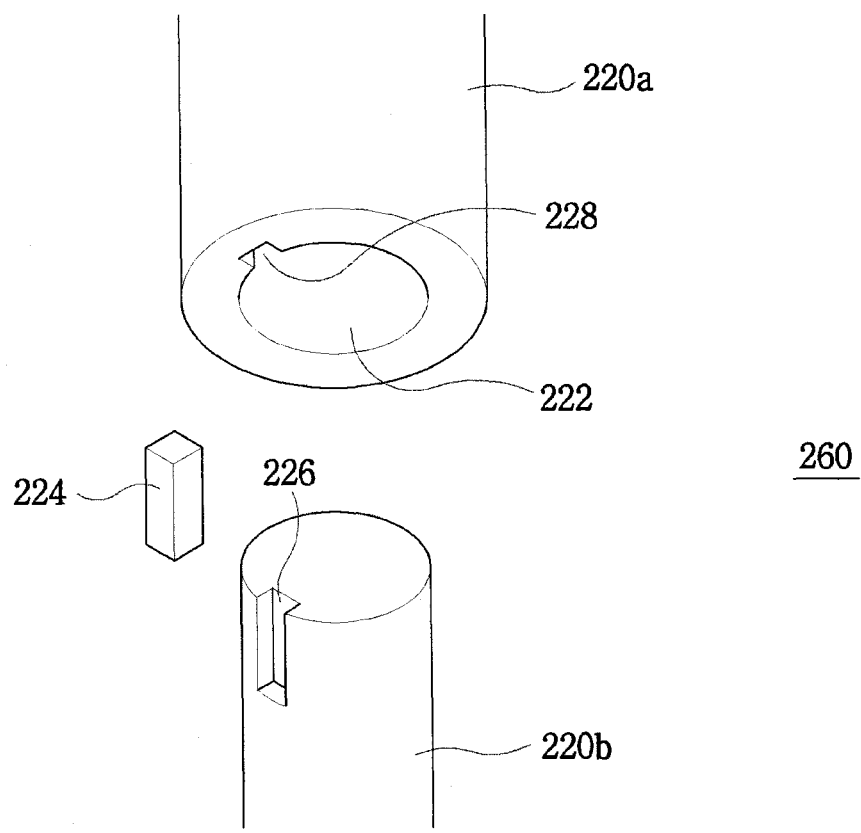
FIG. 5 is an exploded perspective view illustrating an expanding part of FIG. 2.

As shown in FIG. 5, the expanding part may include divided shafts 220a and 220b, a groove 222 formed at an end of the shaft 220a, and an end of the other shaft 220b inserted in an inner circumferential surface of the groove 222 of the shaft 220a.

At this time, a key 224 is disposed in the shaft 220a and the other shaft 220b and the key 224 locks both of the shafts 220a and 220b along the rotation direction.

In other words, the shaft 220 is transferred along a predetermined direction by the linear moving part 250 and the transferred distance moved along the axial direction is generated. At this time, the shaft 220a and the other shaft 220b have freedom in the axial direction, with respect to each other. Because of that, the shaft 220 may be movable.

The expanding part 260 may be provided in a predetermined portion the shaft 220 which is located within the linear moving part 250. It is preferable that the expanding part 260 is provided in 'A' portion where the shaft 220 is coupled to the rotation shaft of the motor as shown in FIG. 2. That is, the shaft 220*a* of the divided shafts 220*a* and 220*b* described above may be an end of the shaft 220 and the other one is the rotation shaft of the motor 210.

Once the linear moving part 250 is moved to space the shaft 220 apart there from, the expanding part 260 is expanded enough to keep the coupling between the motor 210 and the rotation shaft.

Alternatively, the expanding part 260 may be the shaft of the motor 210 which may be movable along the axial direction of the shaft 220 within a predetermined range.

Even without the auxiliary divided shafts 220*a* and 220*b* described above, the distance moved by the linear moving part 250 may be very minute such as dozens of micrometers. Because of that, if the rotation shaft of the motor 210 is movable in the predetermined range, the auxiliary divided shafts do not have to be provided.

The expanding part 260 is elastically expanded as far as the distance to which the shaft 220 is moved. As a result, too much load may not be applied to the connecting portion between the shaft 220 and the motor.

As follows, the first converting part and the second converting part will be described.

The first converting part is a component configured to covert the rotation motion and axial direction linear motion of the shaft 220 into the linear motion of the work table 110.

Such the first converting part includes a screw thread 222 formed along a circumstance of the shaft 220 and a slider 230 configured to press a predetermined portion of the work table 110 to allow the work table 110 to linearly move along the rotation and axial direction linear motion of the shaft 220.

The slider 230 may engage with the screw thread 222 of the shaft 220. Engaging with the screw thread 222, the slider 230 may linearly move along the axial direction of the shaft 220. The slider 230 coupled to the work table 110 presses the work table toward a predetermined direction or the other opposite direction to move it linearly.

As a result, when the motor 210 is rotated, the slider 230 is moved toward the predetermined direction or the other direction along the rotation of the motor 210, to move the wok table 110. When the shaft 220 is moved along the axial direction by the operation of the linear moving part 250, the slider 230 engaging with the shaft 220 is also moved as far as the shaft 220 is moved and the work 110 is transferred accordingly.

Figure 6:
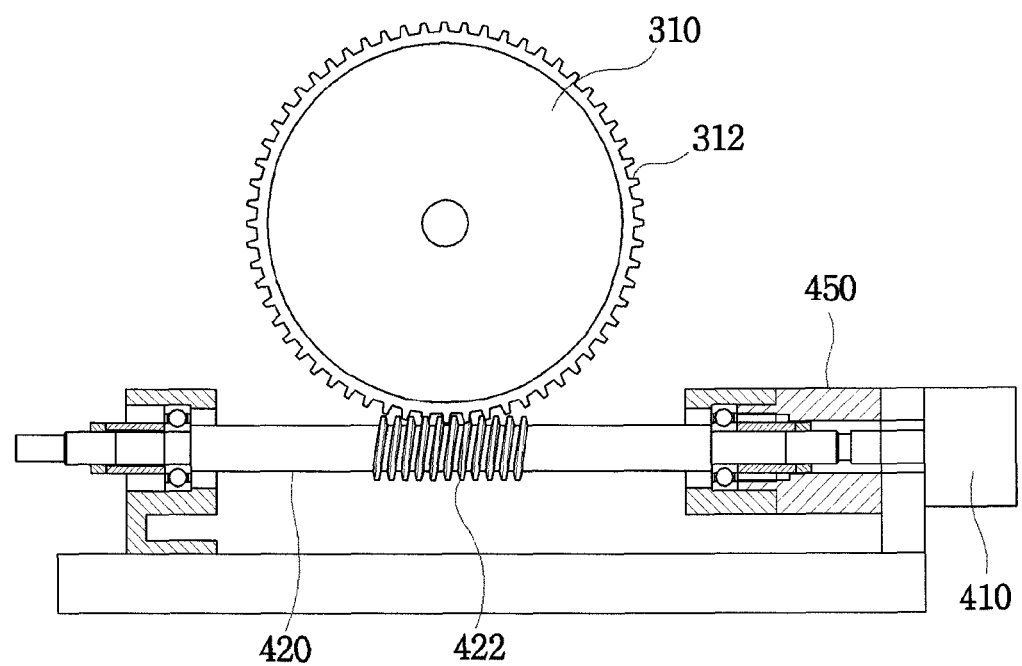
FIG. 6 is a sectional view illustrating a stage according to another embodiment of the present invention.

As shown in FIG. 6, the second converting part is a component configured to convert the rotation and axial direction linear motion of the shaft 420 into the rotational motion of the work table 310.

Such the second converting part includes a screw thread 422 formed at a circumference of the shaft 420 and a saw-tooth part 312 formed in a predetermined portion of the work table 310 to engage with the screw thread of the shaft 420 shown in FIG. 6 to rotate the work table along the rotation and linear motion of the shaft 420.

At this time, the work table 310 has a rotation shaft to be rotatable and the saw-tooth part 312 may be formed at any circumference of the work table 310 having the same rotation shaft as the rotation shaft of the work table 310, for example, an outer circumference of the work table 310 or a circumference of the rotation shaft of the work table 310.

In other words, the screw thread 422 of the shaft 420 and the saw-tooth part 312 of the work table 310 may engage with each other in a rack and pinion method. Once the shaft 420 is rotated by the motor 410, the work table 310 is rotated along the rotational direction of the shaft 420.

Also, when the shaft 420 is moved in the axial direction by the linear moving part 450, the work table 310 engaging with the shaft 420 may be rotated as far as the shaft 420 is moved and the work table 310 may be rotated accordingly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A stage comprising:
   a work table on which a working object is placed;
   a motor configured to provide a rotational force;
   a first shaft rotated by the motor to transfer the work table;
   at least two bearing housings located at both ends of the first shaft;
   a linear moving part located between the motor and first bearing housing and configured to be elastically expandable to linearly move the first shaft in an axial direction of the first shaft, the linear moving part having a hollow to insert an end of the first shaft therein, the hollow located within the linear moving part; and
   an expanding part configured to be elastically expandable as far as the first shaft is moved by the linear moving part, the expanding part located within the linear moving part,
   wherein the expanding part includes:
   one end of a second shaft, directly connected to the motor and driven by the motor, the other end of the second shaft having a portion directly inserted into the end of the first shaft; and
   a key provided between an inner surface of the first shaft and an outer surface of the second shaft to allow the first shaft to move along the axial direction of the first shaft with respect to the second shaft while preventing the first shaft from rotating in a rotational direction thereof with respect to the second shaft.

2. The stage as claimed in claim 1, further comprising:
   a first converting part configured to convert the rotation and linear motion of the first shaft into a linear motion of the work table.

3. The stage as claimed in claim 2, wherein the first converting part comprises,
   a screw thread formed at a circumference of the first shaft;
   a slider configured to press the work table to linearly move the work table along the rotation and linear motion of the first shaft, the slider engaging with the screw thread of the first shaft.

4. The stage as claimed in claim 2, wherein a rotation axis of the first shaft is in parallel to a moving direction of the work table.

5. The stage as claimed in claim 1, further comprising:
   a second converting part configured to convert the rotation and linear motion of the first shaft into rotation of the work table.

6. The stage as claimed in claim 5, wherein the second converting part comprises,
   a screw thread formed at a circumference of the first shaft; and
   a saw-tooth part formed in a predetermined portion of the work table to rotate the work table along the rotation and linear motion of the first shaft, the saw-tooth part engaging with the screw tread of the first shaft.

7. The stage as claimed in claim 5, wherein a rotation axis of the first shaft is not in parallel to a moving direction of the work table.

8. The stage as claimed in claim 1, further comprising:
a supporting stand provided at the other end of the first shaft to support a second bearing housing configured to allow the rotation of the first shaft to be smooth, the supporting stand elastically transformed as far as the transfer distance of the first shaft moved by the linear moving part.

9. The stage as claimed in claim 1, wherein the linear moving part is an actuator using a Piezo material.

10. The stage as claimed in claim 1, wherein the bearing housing comprises at least two bearings configured to allow the rotation of the first shaft to be smooth.

\* \* \* \* \*